US008364040B1

(12) United States Patent
Gerszberg et al.

(10) Patent No.: US 8,364,040 B1
(45) Date of Patent: Jan. 29, 2013

(54) METHOD AND APPARATUS FOR PROVIDING CONVERGED SERVICES

(75) Inventors: Irwin Gerszberg, Kendall Park, NJ (US); Adrian Matthews, Bridgewater, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 681 days.

(21) Appl. No.: 11/290,257

(22) Filed: Nov. 30, 2005

(51) Int. Cl.
*H04B 10/00* (2006.01)
(52) U.S. Cl. .................. 398/125; 398/124; 398/128
(58) Field of Classification Search .............. 398/58, 398/66, 74, 118–131
See application file for complete search history.

(56) References Cited

U.S. PATENT DOCUMENTS

| | | | | |
|---|---|---|---|---|
| 5,463,647 | A | * | 10/1995 | Pan .................................. 372/12 |
| 5,914,976 | A | * | 6/1999 | Jayaraman et al. ......... 372/50.21 |
| 7,257,327 | B2 | * | 8/2007 | Small ............................. 398/118 |
| 7,453,835 | B1 | * | 11/2008 | Coty et al. ..................... 370/310 |
| 2002/0131123 | A1 | * | 9/2002 | Clark ............................ 359/154 |
| 2002/0181444 | A1 | * | 12/2002 | Acampora .................... 370/352 |
| 2003/0218994 | A1 | * | 11/2003 | Caminiti et al. .............. 370/316 |
| 2005/0084267 | A1 | * | 4/2005 | Fan et al. ......................... 398/84 |
| 2005/0196170 | A1 | * | 9/2005 | Winsor .......................... 398/118 |
| 2006/0111111 | A1 | * | 5/2006 | Ovadia .......................... 455/439 |
| 2007/0002327 | A1 | * | 1/2007 | Zhou et al. .................... 356/456 |
| 2007/0019959 | A1 | * | 1/2007 | Retnasothie et al. ......... 398/115 |

* cited by examiner

*Primary Examiner* — Dzung Tran

(57) ABSTRACT

A method and apparatus for providing link establishment in the access segment of the communications network using broadband multi-wavelength LED are disclosed. In one embodiment, such links may be established in point-to-point, point-to-multipoint, multipoint-to-multipoint, or ring format depending on the topology required for optimized access network build-out.

16 Claims, 3 Drawing Sheets

METHOD AND APPARATUS FOR PROVIDING CONVERGED SERVICES

The present invention relates generally to communication networks and, more particularly, to a method and apparatus for providing converged services using broadband Light Emitting Diode (LED) Free Space Optical (FSO) links in a communication network.

BACKGROUND OF THE INVENTION

Presently, there is a tremendous push by the telecommunications carrier community to build out the last mile. Over the last five years, a great deal of resource was committed to building out the core network. This effort being overwhelmingly successful, there is a substantial data bottleneck at the edges of the network, obviating the need for addressing build-out requirements in this area.

Therefore, a need exists for a method and apparatus for providing converged services, e.g., using broadband LED FSO links in a communication network.

SUMMARY OF THE INVENTION

In one embodiment, the present invention enables a method and apparatus for providing link establishment in the access segment of the communications network using broadband multi-wavelength LED. Such links may be established in point-to-point, point-to-multipoint, multipoint-to-multipoint, or ring format depending on the topology required for optimized access network build-out. Packet and legacy services involving nodal, managed and private line services are more effectively carried over broadband multi-wavelength FSO links that are characterized by higher availability.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The use of free space optics for communication networks does not come without its sources of difficulties. Fog, scintillations, mounting vibrations, heat, weather, and solar events all serve to limit the effectiveness of a free space optical link in one way or another, leading directly to a reduction in link availability relative to the performance of comparable radio links. Modern-day free space optical links are more or less characterized by single frequency laser links that are optimized for only certain atmospheric zones, which allow the passage of a particular choice of radiating laser. Such links are very susceptible to link outages when fog events with affinity associated with the choice of radiating laser is present.

However, there are many significant benefits to be obtained with the use of free space optical links. To briefly name a few, free space optical communications allows for rapid link deployment in situations where fiber-base capacities are required, but the costs associated with laying fiber may be prohibitive. For short hops in metropolitan areas, deployments behind optical fiber may be aggregated to route communications signals around tall buildings and free space optical links may easily be aggregated to form mesh networks.

The present invention enables a more effective strategy for improving link availability in free space optical network deployments using multi-pass atmospheric zones instead. Specifically, the present invention enables a method and apparatus for link establishment in the access segment of the communications network using broadband multi-wavelength LED. Such links may be established in point-to-point, point-to-multipoint, multipoint-to-multipoint, or ring format depending on the topology required for optimized build-out. Packet and legacy services involving nodal, managed and private line services are more effectively carried over these broadband multi-wavelength FSO links that are characterized by higher availability.

Figure 1:
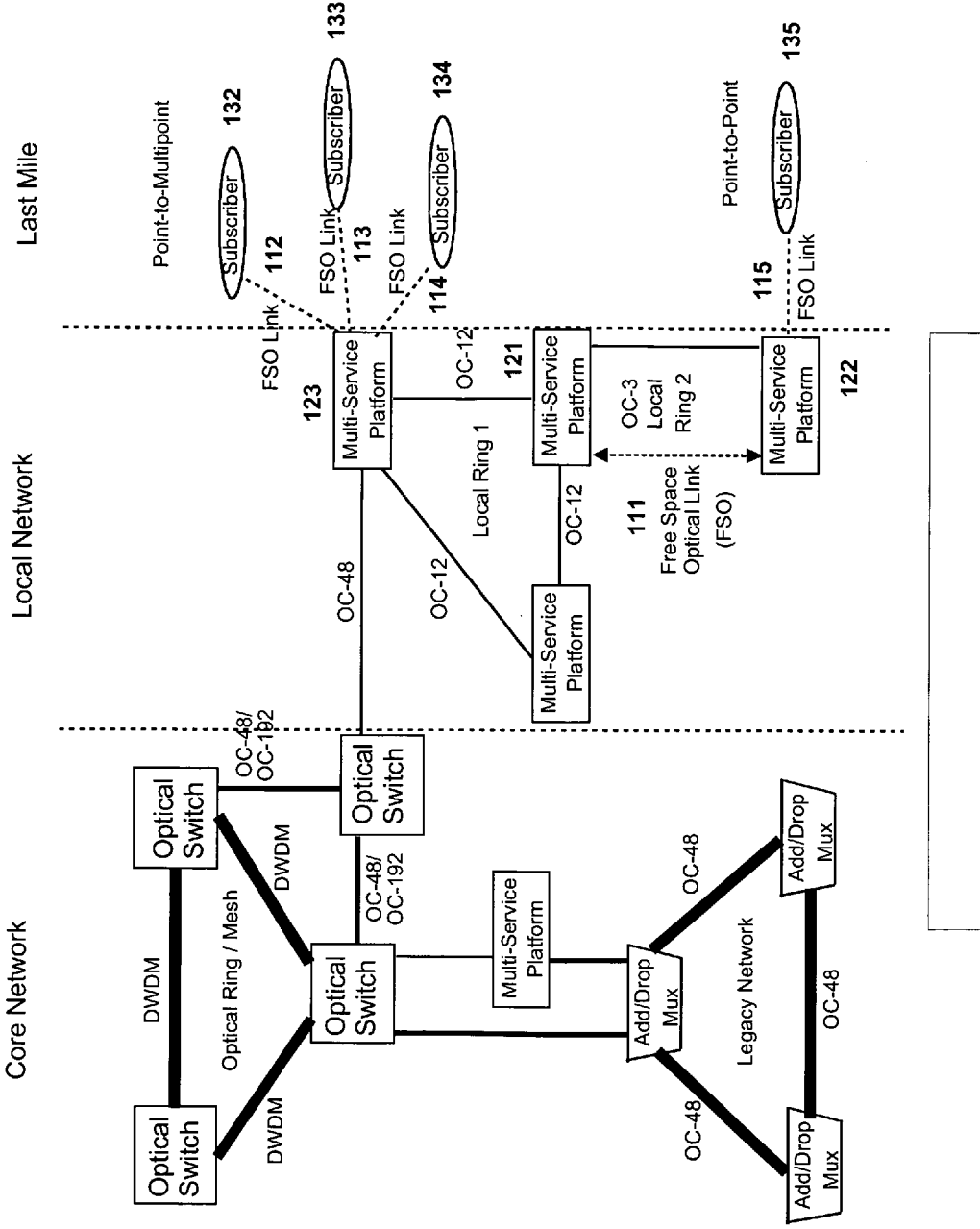
FIG. 1 illustrates an exemplary Broadband LED service network of the present invention.

An illustrative scenario in which the principles of the present invention are employed is depicted in FIG. 1. FIG. 1 shows an advanced network configuration 100 in which the broadband multi-wavelength LED may be used to deliver service to the subscriber. The network is composed of three parts that are seamlessly integrated to form the whole. These different parts are identified as the Core Network 101, the Local Network 102, and the Last Mile Network 103 connectivity arrangement. In FIG. 1, the broadband multi-wavelength LED FSO link is present in the Local Network and Last Mile Network. However, it may also be used in the Core Network if deemed appropriate by network providers. In the Local Network 102, the broadband multi-wavelength LED FSO link 111 is used as part of a Local Ring 2 comprising Multi-service Platform network element 121 and Multi-service Platform network element 122, in a protected arrangement in which the ring is completed.

In the Last Mile Network 103, the broadband multi-wavelength LED FSO links are used both in point-to-point and point-to-multipoint configurations. For instance, broadband multi-wavelength LED FSO link 115 is used in a point-to-point configuration by Multi-service Platform network element 122 to provide connectivity to subscriber 135. Broadband multi-wavelength LED FSO links 112, 113, and 114 are used in a point-to-multipoint configuration by Multi-service Platform network element 123 to provide connectivity to subscribers 132, 133, and 134, respectively.

Figure 2:
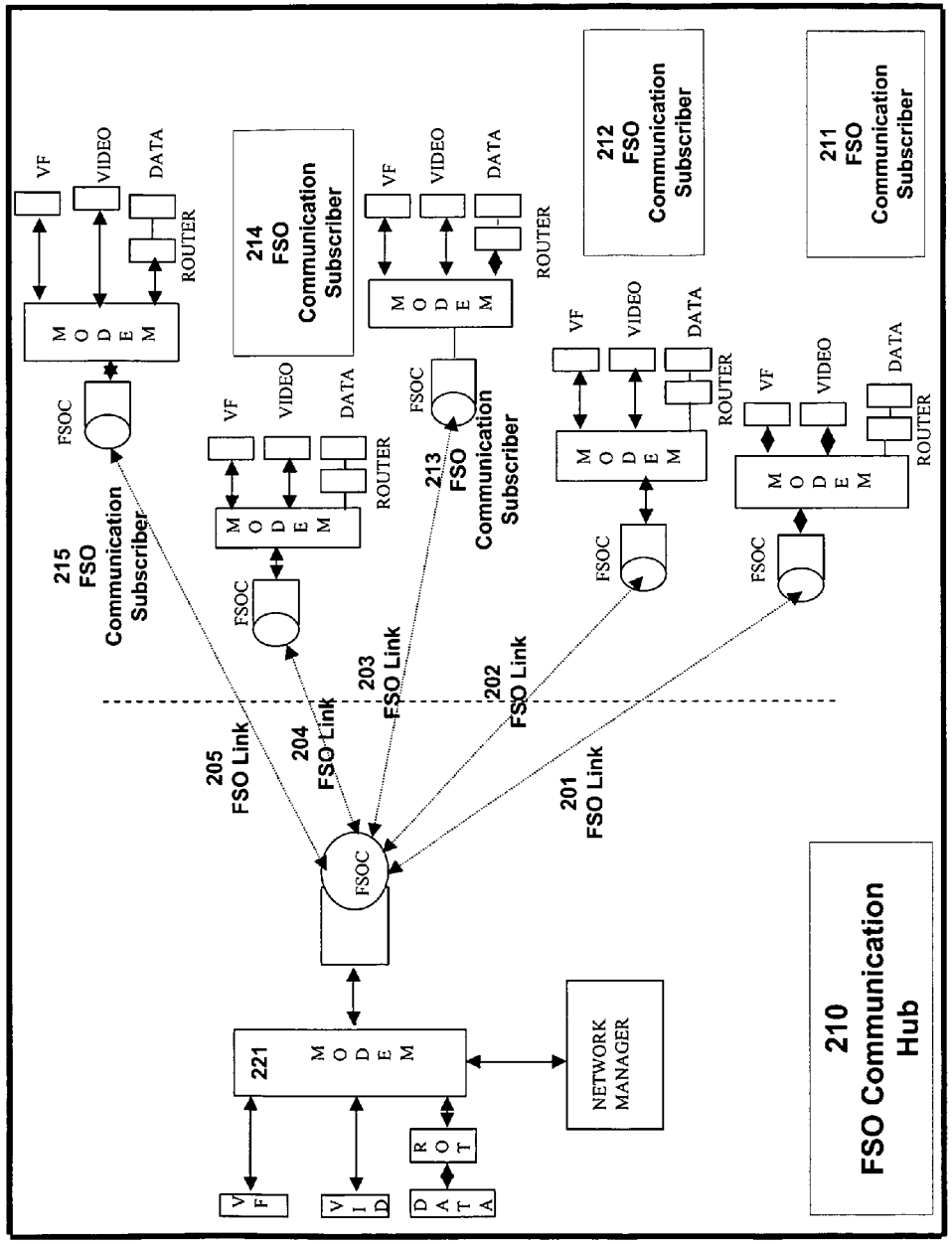
FIG. 2 illustrates an example a broadband LED multi-wavelength point-to-multipoint FSO communication system characterized by a hub site supporting multiple subscriber locations of the present invention.

FIG. 2 shows an exemplary broadband multi-wavelength LED point-to-multipoint FSO communication system 200 characterized by a hub site supporting multiple subscriber locations. In one embodiment, the FSO communication hub 210 comprises a number of broadband multi-wavelength LED FSO transceiver systems providing converged services, such as voice, video, and data services, to a number of subscribers, e.g., subscribers 211 to 215, using broadband multi-wavelength LED FSO links 201 to 205 respectively. Effectively, hub 210 consolidates multiple point-to-point broadband multi-wavelength LED FSO links, 201 to 205, into a single point-to-multipoint broadband multi-wavelength LED FSO hub. The transceiver comprises a modem 221 with a built-in multiplexer and optical and electrical interfaces. The modem has the capability for multi-modulation schemes such as ON/OFF, Phase Shift Keying (PSK), Quadrature Amplitude Modulation (QAM), and Frequency Shift Keying (FSK) modulation. Finally, modem 221 has the ability to determine which wavelength is best suited for communication during foggy weather conditions, since fog disperses the LED light beam and thus creates the potential for a service outage. For example, a selected receive signal integrity is maintained at or above a specific level of service using a bit error rate computed over said spectrum of available wavelengths.

In one embodiment, the broadband multi-wavelength LED operates simultaneously across 720-900 nm spectrum and the transmitted signal spreads over the entire wavelength area. Namely, the broadband LED FSO link may radiate optical energy over a broad spectrum of wavelengths to enhance transmitted signal integrity over a collection of atmospheric zones that admit laser energy. This secures reliable communications under most weather conditions.

The transmitter power of broadband multi-wavelength LED is typically about 100 mW. The aperture of the receiver is approximately 10 cm, providing a large collector surface area. This allows the system to function reliably in heavy rain, snow and dense fog. The diffraction angle is approximately 1°. This provides a projected functional beam at approximately 1.5 km of 10 m. This allows sufficient margin if the mounting structures are unstable. The transceiver on the subscriber site has a similar design. With such flexibility built into the broadband multi-wavelength LED FSO link, the end result is a high capacity and high availability FSO communication system capable of delivering converged services in any weather conditions. Vendors that provide broadband multi-wavelength LED technologies and components include Sceptre Communications Limited of Philadelphia, Pa.

Figure 3:
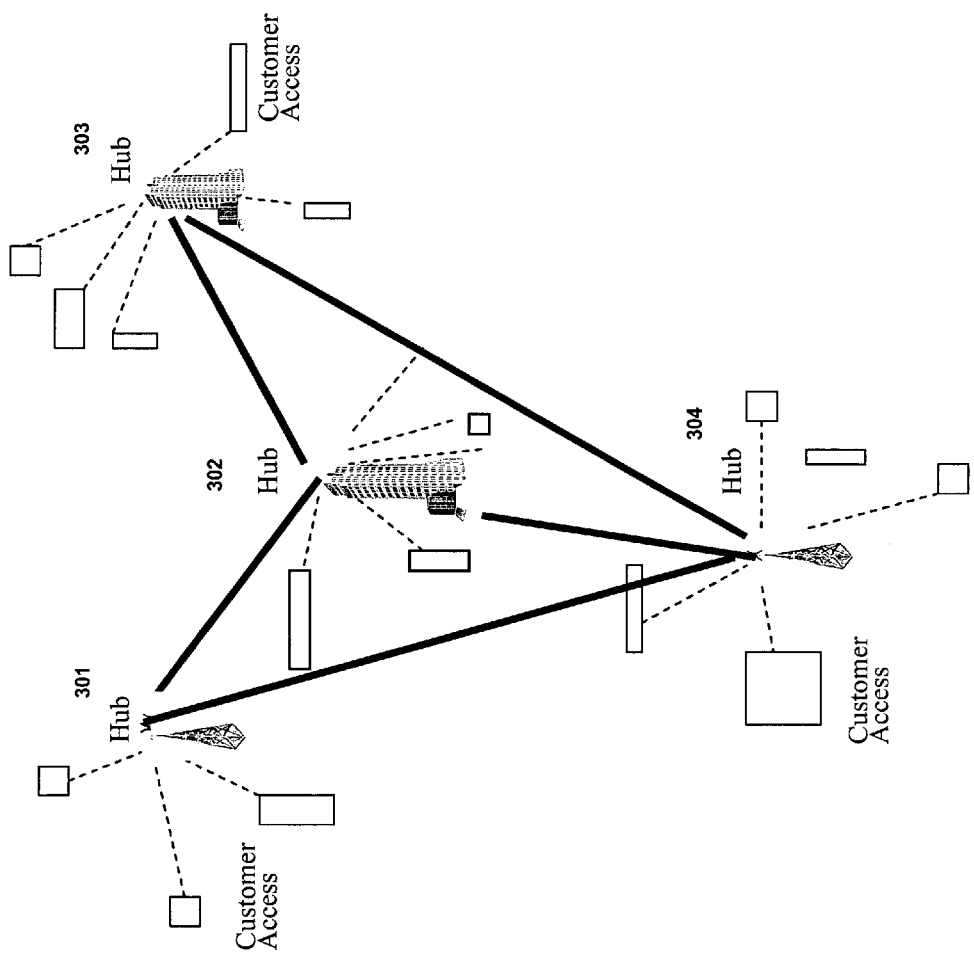
FIG. 3 illustrates an example of a mesh network in which user data is transported by the broadband LED multi-wavelength FSO communication links of the present invention.

FIG. 3 depicts a mesh, multipoint-to-multipoint, network 300 in which user data is transported by the broadband LED multi-wavelength FSO communication links. Each hub site can be conceived as a point-to-multipoint hub. By connecting multiple of such point-to-multipoint hub sites, a mesh, or multipoint-to-multipoint, network can be formed. In addition, from each hub site, there is more than one path to reach all other hub sites within the overall network. Therefore, this is effectively a mesh network. In the case of a failure of any single link in the mesh, there is the inherent capability to reroute user data over alternate paths to the appropriate destinations. For instance, hub 301 and hub 302 have two possible FSO communication paths. One path comprises FSO link segment hub 301 to hub 302, and another path, alternate path, comprises FSO link segments hub 301 to hub 304 and hub 304 to hub 302. This alternate path provides redundancy to the mesh network.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing a service using a broadband light emitting diode free space optical link in a communication network, comprising:
deploying a broadband multi-wavelength light emitting diode free space optical link to support communication with a subscriber, wherein the broadband multi-wavelength light emitting diode free space optical link radiates optical energy over a spectrum of wavelengths;
selecting a wavelength from the spectrum of wavelengths that is suited for a particular atmospheric condition; and
delivering the service to the subscriber over the broadband multi-wavelength light emitting diode free space optical link over the wavelength that is selected.

2. The method of claim 1, wherein the service comprises a voice application.

3. The method of claim 1, wherein the wavelength is selected to maintain a specific level of service.

4. The method of claim 1, wherein the broadband multi-wavelength light emitting diode free space optical link comprises a broadband multi-wavelength light emitting diode free space optical transmitter and a broadband multi-wavelength light emitting diode free space optical receiver at each endpoint of a plurality of endpoints.

5. The method of claim 1, wherein the broadband multi-wavelength light emitting diode free space optical link is deployed in a configuration that forms a mesh network.

6. The method of claim 5, wherein the mesh network provides path diversity.

7. The method of claim 1, wherein the service comprises a video application.

8. The method of claim 1, wherein the service comprises a data application.

9. A system for providing a service using a broadband light emitting diode free space optical link, comprising:
a broadband multi-wavelength light emitting diode free space optical link to support communication with a subscriber, wherein the broadband multi-wavelength light emitting diode free space optical link radiates optical energy over a spectrum of wavelengths;
means for selecting a wavelength from the spectrum of wavelengths that is suited for a particular atmospheric condition; and
means for delivering the service to the subscriber over the broadband multi-wavelength light emitting diode free space optical link over the wavelength that is selected.

10. The system of claim 9, wherein the service comprises a voice application.

11. The system of claim 9, wherein the wavelength is selected to maintain a specific level of service.

12. The system of claim 9, wherein the broadband multi-wavelength light emitting diode free space optical link comprises a broadband multi-wavelength light emitting diode free space optical transmitter and a broadband multi-wavelength light emitting diode free space optical receiver at each endpoint of a plurality of endpoints.

13. The system of claim 9, wherein the broadband multi-wavelength light emitting diode free space optical link is deployed in a configuration that forms a mesh network.

14. The system of claim 13, wherein the mesh network provides path diversity.

15. The system of claim 9, wherein the service comprises a video application.

16. A system for providing a service using a broadband light emitting diode free space optical link, comprising:
a plurality of multi-service platform network elements, wherein one of the multi-service platform network elements is configured to select a wavelength from a spectrum of wavelengths that is suited for a particular atmospheric condition; and
a broadband multi-wavelength light emitting diode free space optical link that is deployed between two of the plurality of multi-service platform network elements to form a ring network, wherein the broadband multi-wavelength light emitting diode free space optical link radiates optical energy over a spectrum of wavelengths, and wherein the broadband multi-wavelength light emitting diode free space optical link is configured to deliver a service over the wavelength that is selected by the one of the multi-service platform network elements.

* * * * *